United States Patent [19]

Allain

[11] Patent Number: 5,634,234
[45] Date of Patent: Jun. 3, 1997

[54] WIPER ACCESSORY FOR A SIDE MOUNTED REAR VIEW MIRROR OF A VEHICLE

[76] Inventor: Marcel Allain, P.O. Box 179, Neguac, N. B., Canada, E0C 1S0

[21] Appl. No.: 445,216

[22] Filed: May 18, 1995

[51] Int. Cl.$^6$ .................. B60S 1/48; B60S 1/56; B60R 1/06
[52] U.S. Cl. .................. 15/250.003; 15/250.04; 15/250.13; 15/250.23; 359/864; 359/865; 359/844; D12/219; D12/220
[58] Field of Search .................. 15/250.003, 250.23, 15/250.3, 250.29, 250.001, 250.13, 250.04; D12/188, 187, 219, 220; 359/850, 864, 865, 844, 507, 869, 871, 872

[56] References Cited

U.S. PATENT DOCUMENTS

| | | | |
|---|---|---|---|
| 2,944,277 | 7/1960 | Ochello et al. | 15/250.003 |
| 3,526,920 | 9/1970 | Boyanich, Sr. | 15/250.29 |
| 3,618,156 | 11/1971 | Riggs | 15/250.29 |
| 3,685,087 | 8/1972 | Pittman | 15/250.24 |
| 3,866,258 | 2/1975 | DeGraw | 15/250.29 |
| 3,893,204 | 7/1975 | Kolb | 15/250.23 |
| 3,968,537 | 7/1976 | Wagenhofer | 15/250.29 |
| 4,672,708 | 6/1987 | Williams | 15/250.003 |
| 4,763,381 | 8/1988 | Williams | 15/250.003 |
| 4,907,871 | 3/1990 | Hou | 359/865 |
| 4,921,340 | 5/1990 | Dyer | 359/864 |
| 5,150,497 | 9/1992 | Preik | 15/250.003 |
| 5,179,758 | 1/1993 | Smith et al. | 15/250.003 |

FOREIGN PATENT DOCUMENTS

2039933  4/1991  Canada .................. 15/28

*Primary Examiner*—Gary K. Graham
*Attorney, Agent, or Firm*—Mario D. Theriault

[57] ABSTRACT

A wiper accessory for a side mounted rear view mirror of a vehicle, comprising; a wiper blade, a drive module having a rotary drive and a flexible pantograph arm for moving the wiper blade in a reciprocal movement across the reflective surface of the rear view mirror, and an auxiliary mirror mounted on the drive module for advantageously use the sightless area adjacent the side mounted rear view mirror. The drive module further has a U-shaped bracket comprising an horizontal member having one hole for mating onto a vertical mounting bolt of the rear view mirror in a rotatively adjustable manner about an axis defined by the bolt, and two spaced apart vertical members having each a retaining pivot horizontally in line with one another for retaining the drive module of the wiper accessory in a rotatively adjustable manner about an axis defined by the alignment of the two retaining pivots. The advantage of this U-shaped mounting member and the flexible pantograph arm is that both the auxiliary mirror and the side mounted rear view mirror are independently adjustable to different view points without adversely affecting the operation of the wiper accessory.

20 Claims, 7 Drawing Sheets

WIPER ACCESSORY FOR A SIDE MOUNTED REAR VIEW MIRROR OF A VEHICLE

FIELD OF THE INVENTION

The present invention relates to a wiper accessory for a side mounted rear view mirror of a vehicle, and more particularly it relates to a drive module for the wiper blade which is adjustable from the mirror frame such that an auxiliary mirror may he mounted thereon.

BACKGROUND OF THE INVENTION

Side mounted rear view mirrors on a vehicle, and especially on transport trucks, are exposed to rain, snow, dew, dirt, and road salt. Those mirrors are often smeared and dirty, partially blocking the driver's view of the traffic besides and behind his vehicle.

Furthermore, it is not always practical for a truck driver to stop and wipe the rear view mirrors as often as his vision therein becomes hazy, and unsafe for the operation of the vehicle. For those reasons, it is desirable to have wiper devices mounted on these mirrors, and operable from the cab of the vehicle.

Various efforts have been made in the past to provide wipers for the outside, side mounted rear view mirrors of trucks, trailer trucks and vehicles of the like. For example, U.S. Pat. No. 3,685,087 issued on Aug. 22, 1972 to M. B. Pittman, discloses a wiper mechanism incorporated inside the housing of a rear view mirror. In this invention, the wiper blade reciprocates in an up and down motion. The wiper blade is driven in this movement by an arm which extends from within the mirror housing, and which travels along one side of the mirror frame.

As another example, U.S. Pat. No. 3,968,537 issued on Jul. 13, 1976 to J. J. Wagenhofer, discloses a wiper assembly which is adaptable for use with most types of laterally supported truck mirrors without radical structural alteration to the mirror frame. The wiper drive mechanism comprises a reciprocating plunger activated by a crank wheel and a rotary motor. The mechanism is contained within a housing which is held on the top of the mirror by a clamping member. The wiper blade is driven from side to side of the mirror surface, by the reciprocating plunger.

As a further example, a Canadian Patent Application serial no. 2,039,933 filed on Oct. 9, 1992, by R. B. Patterson, has a pneumatic cylinder attached to the upper portion of the mirror frame. The pneumatic cylinder pulls and pushes the wiper blade across the glass of the mirror.

The foregoing examples are just a few representative examples of efforts of others to deal with the problem of cleaning outside side mounted rear view mirrors. Generally, the prior art devices have the shortcomings of having slots within the mechanism compartment whereby moisture, dirt and road salt may deteriorate the internal components of the drive mechanism. Likewise, freezing rain and snow may penetrate and harden inside the slot to obstruct the movement of the wiper blade.

Other inconveniences with prior art wiper drive modules of the type which is attached to the frame of the mirror, comprise the fact that the volume of the drive housing mounted on the top of the mirror frame creates a sightless area above each side mirror.

Moreover, prior art wiper drive modules of the latter type require precise and rigid positioning onto the mirror frame, such that the movement of the wiper blade remains parallel to the surface of the glass. Hence this type of drive module must be fastened to the mirror frame such that its ideal position relative to the surface of the mirror is maintained even when the mirror is adjusted to the preference of different truck drivers.

It is also customary for a truck driver to attach an auxiliary flat or convex mirror to his main side rear view mirror. The alternate view point provided thereby is particularly useful to monitor the rear end of the trailer during wide turns, or to periodically check the movement of a load such as wood logs or bulky machinery. The presence of these auxiliary mirrors renders the installation of prior art wiper modules yet more difficult.

SUMMARY OF THE INVENTION

In the present invention however, there is provided a wiper accessory for a rear view mirror having at least one mounting bolt. This wiper accessory comprises; a wiper blade, a drive module comprising a rotary drive means for moving the wiper blade in a reciprocal movement, an arm means between the wiper blade and the rotary drive means for guiding the movement of the wiper blade at a radial distance from an axis of rotation of the rotary drive means, the arm means being flexible in a direction of the axis of rotation, and a mounting means for retaining the drive module to the mounting bolt.

A first advantage of this embodiment and especially of the flexible arm means, is that the orientation of the rotary drive means is not truly dependent on the orientation of the side mounted rear view mirror. The wiper accessory is readily mounted onto the mounting bolt of a typical side mounted rear view mirror, without requiring a precise alignment of a plane of operation of the rotary drive means to the plane of the mirror. Hence, the orientation of the side mounted rear view mirror is adjustable to the preference of different drivers without having to re-position the wiper accessory.

In accordance to another aspect of the present invention, the mounting means for the wiper accessory is a U-shaped bracket comprising an horizontal member having one hole for mating onto the mounting bolt of the mirror, in a rotatively adjustable manner about an axis defined by the bolt, and two spaced apart vertical members having each a retaining pivot means horizontally in line with one another for retaining the drive module of the wiper accessory in a rotatively adjustable manner about an axis defined by the alignment of the two retaining pivot Hence, a second advantage of the present invention is that an auxiliary mirror such as a convex mirror may be mounted on the drive module, whereby both the auxiliary mirror and the side mounted rear view mirror are independently adjustable to different view points. Such a mounting of an auxiliary mirror on the drive module advantageously uses the sightless area adjacent the side mounted rear view mirror.

In accordance to a further aspect of the present invention, there is provided a rear view mirror mounted on the side of a vehicle, wherein the rear view mirror has; a near edge and a far edge relative to a position of a driver of the vehicle, a wiper accessory mounted thereon, the wiper accessory having; a wiper blade, a drive module comprising a rotary drive means for moving the wiper blade in a reciprocal movement across and within a reflective surface of the rear view mirror, and for stopping the wiper blade on a near edge of the mirror. The wiper accessory also has an auxiliary mirror mounted on a surface of the drive module.

A further advantage of the present invention is that when the wiper blade is in the rest position on a near side of the mirror, the sight of the driver therein is not hindered by the reflection of the wiper blade, and the reflective surface of the rear view mirror remains nearly integral.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENT

Figure 1:
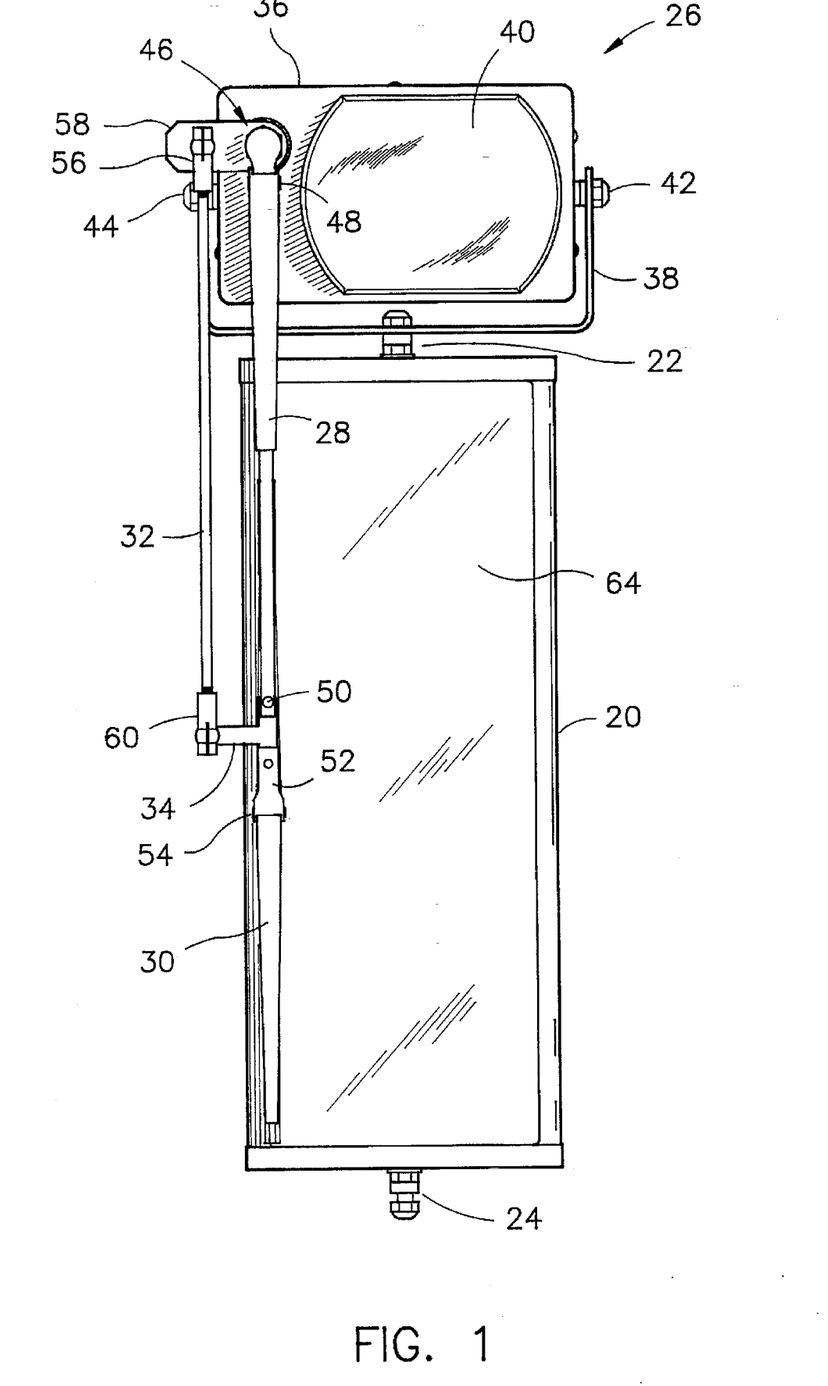
FIG. 1 is a front view of a side mounted rear view mirror having a combination of a wiper accessory and a convex mirror mounted atop thereof. The wiper blade is shown on a near edge of the reflective surface.
Figure 2:
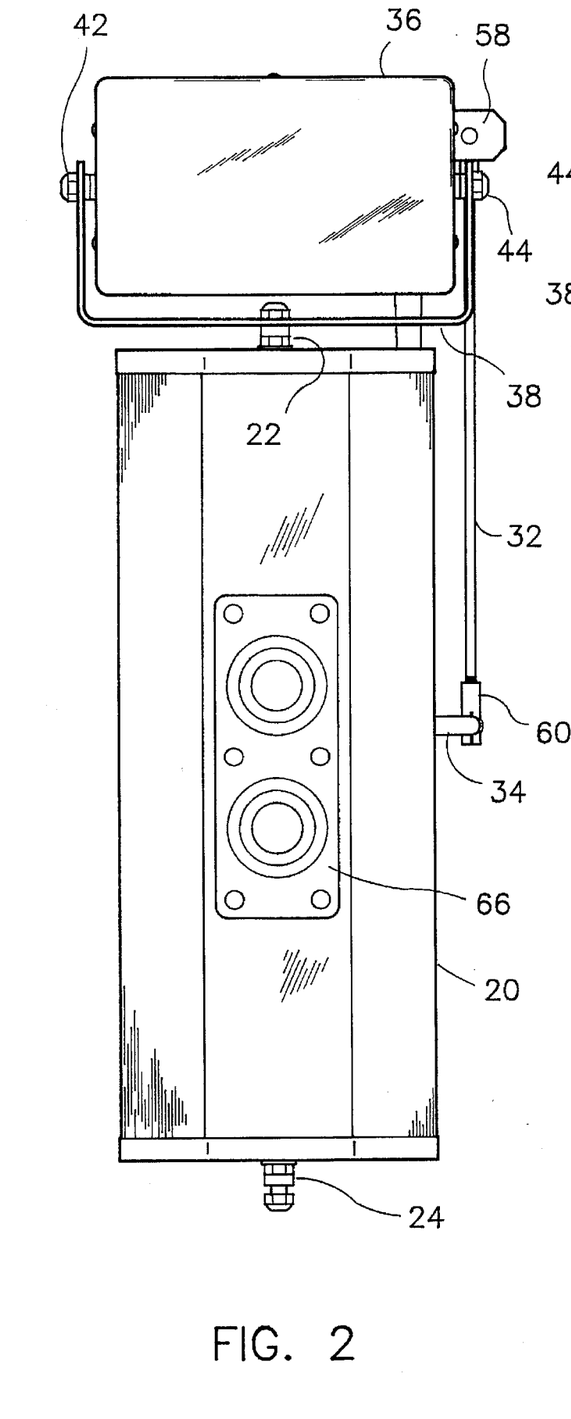
FIG. 2 is a rear view of the side mounted rear view mirror of FIG. 1.

Referring to FIG. 1, there is illustrated a rear view mirror 20 of the type having a top mounting bolt 22 and a bottom mounting bolt 24. The figure further illustrates a wiper accessory 26 comprising a wiper arm 28, a wiper blade 30, a pantograph link rod 32, a swivel plate 34, and a wiper drive module 36. The wiper drive module 36 is preferably held atop the mirror 20 by means of a tilt bracket 38, and two mounting bolts 42 and 44, each of which being located on a respective side of tilt bracket 38. The tilt bracket 38 has a hole in its lower portion for mounting onto mounting bolt 22 or 24. This mounting hole is not illustrated as such, but one may refer to the accompanying figures to determine the exact dimension and placement thereof.

A convex mirror 40 is preferably mounted on a front face of the housing of the drive module 36.

The movement of wiper blade 30 across the surface of mirror 20 may be better understood by making reference to FIGS. 1 to 7 simultaneously. The drive means for the wiper arm 28 is of the rotary type, causing the blade 30 to move back and forth across the reflective surface of the mirror 20 following a circular movement, about a drive shaft 46. The drive shaft 46 is better illustrated on FIG. 6. The drive shaft 46 makes a right angle with a front surface of drive module 36.

Figure 6:
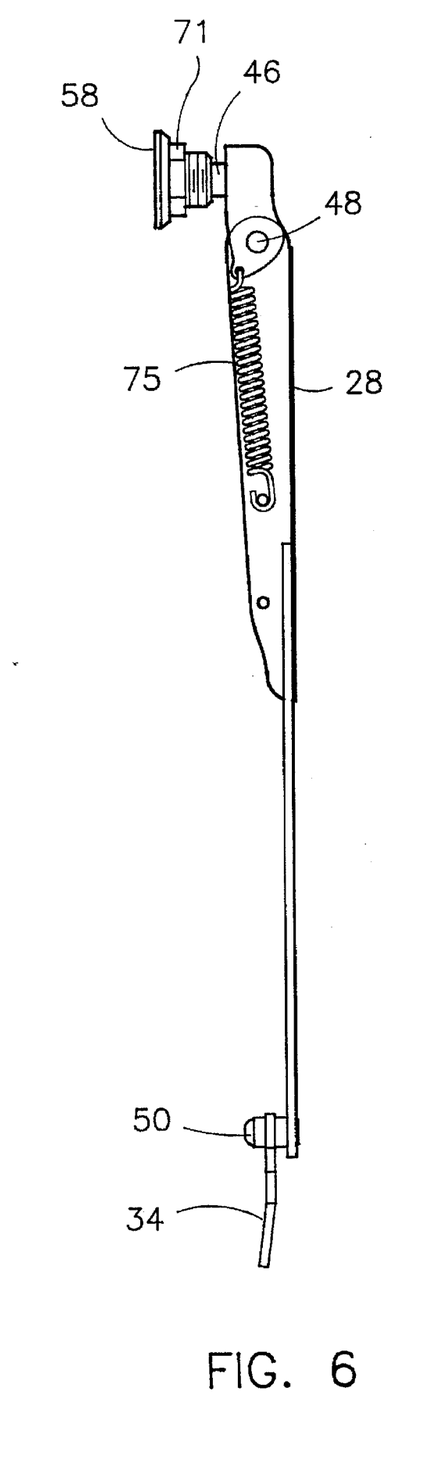
FIG. 6 is a cross section of the wiper arm showing the spring therein.

The wiper arm 28 is of the type commonly rotund on automobiles and trucks, being flexible about a pivot pin 48 perpendicular to the longitudinal axis of the arm 28. The end of wiper arm 28 is connected to the swivel plate 34 by a pivot pin 50 oriented in a parallel relationship to the drive shaft 46.

The wiper blade 30 is also of the type commonly found on highway vehicles, with a mounting clip 52 pivoted on the wiper blade 30 about a pivot pin 54, oriented perpendicularly to the longitudinal axis of the wiper blade 30.

Figure 7:
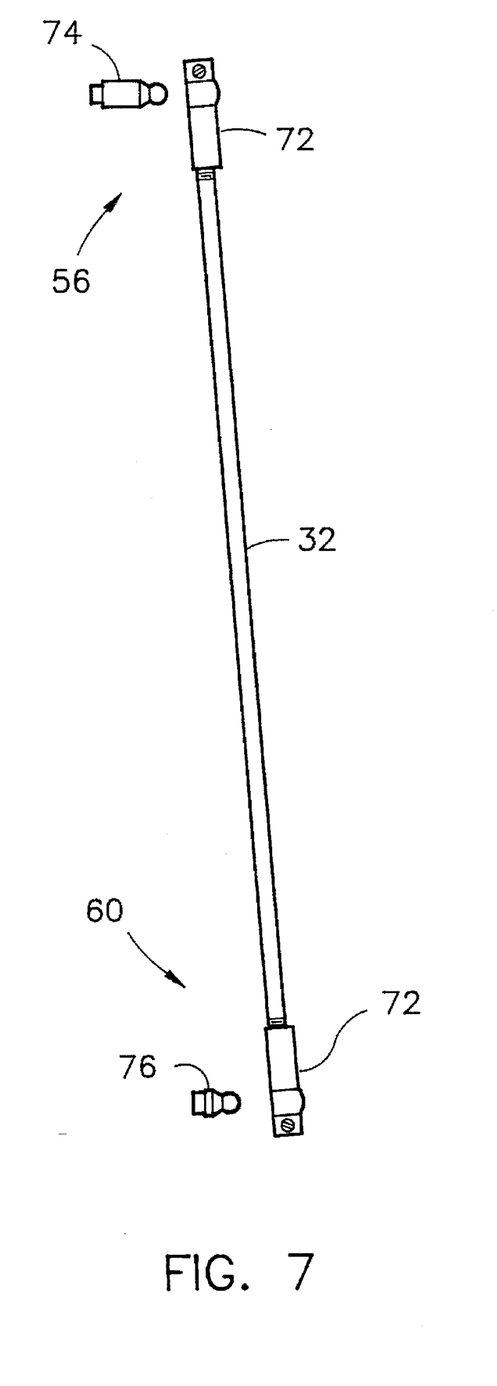
FIG. 7 illustrates a side view of the components of the pantograph link rod.

The pantograph link rod 32 has a ball and socket joint 56 at its upper extremity to retain the rod 32 on a stationary plate 58. The pantograph link rod 32 also has a ball and socket joint 60 at its lower extremity to connect the link rod 32 to swivel plate 34.

Thus the combination comprising transverse pivot 48, parallel pivot 50, and transverse pivot 54, causes the edge 62 of wiper blade 30 to follow the plane of the glass 64 of the mirror 20 even when a front face of the wiper drive module 36 is not parallel to the plane of reflective surface 64.

Figure 4:
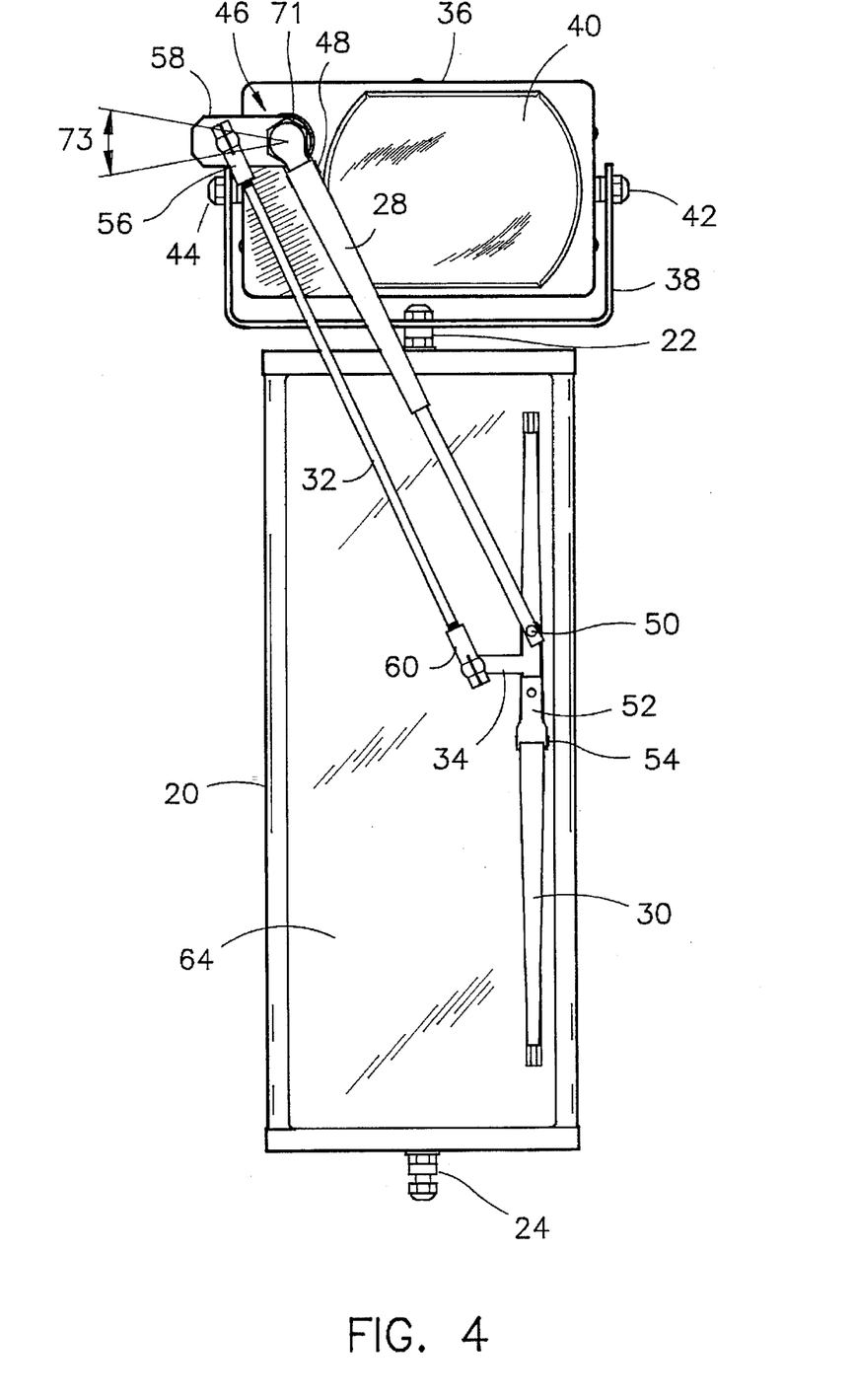
FIG. 4 is a front view of the side mounted rear view mirror of FIG. 1, with the wiper blade on the far edge of the reflective surface.

The further combination comprising the pivots 48, 50, 54, pantograph link rod 32 with both ball and socket joints 56 and 60 causes the wiper blade 30 to maintain a parallel relation with a longitudinal axis of mirror 20 during the lateral movement thereof across the reflective surface 64, as it is specifically illustrated on FIG. 4.

One advantage of the above described flexible pantograph linkages between the wiper blade 30 and the drive module 36 is that the wiper accessory 26 may be readily mounted on a single bolt of an ordinary side mounted rear view mirror 20 of a vehicle. Furthermore the wiper accessory 26 may be readily mounted onto a portion of a bolt 22 extending from an ordinary support arm of an ordinary side mounted rear view mirror 20, without requiring precise alignment of the drive module 36 to the mirror surface, or without requiring precise positioning of the drive module 36 in relation to the longitudinal axis of the mirror 20.

Another advantage of the above described flexible pantograph linkages between the wiper blade 30 and the drive module 36 is that the wiper drive module 36 is adjustable about a vertical axis of mounting bolt 22, and is also adjustable about a horizontal axis between mounting bolts 42 and 44. Thus the auxiliary mirror 40 mounted thereon is adjustable from the main mirror 20, such that both mirrors may have different orientations, while maintaining an efficient operation of the wiper accessory 26.

Referring back to FIG. 2, the mirror 20 may optionally be of the type with a reflective light 66 on its face facing forwardly relative to the vehicle.

Figure 3:
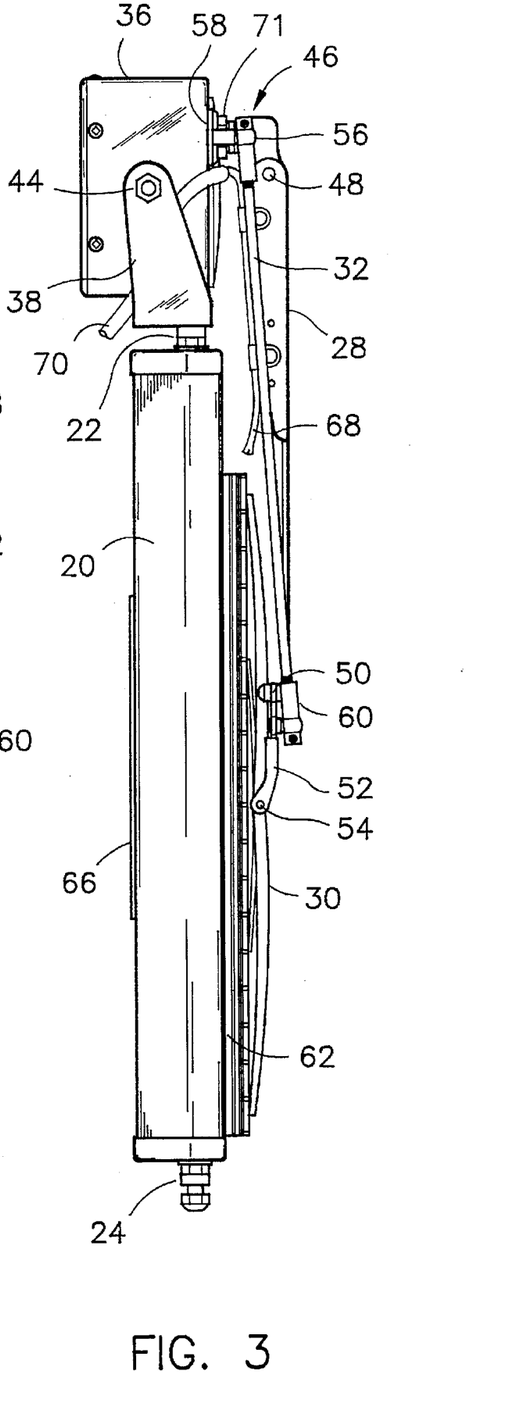
FIG. 3 is a side view of the side mounted rear view mirror of FIG. 1.

FIG. 3 of the preferred embodiment illustrates a washing fluid tubing-nozzle 68 attached to the wiper arm 28, and directed toward the upper end of the wiper blade 30. The tubing-nozzle 68 is connected to a hose means 70 from a washing fluid reservoir commonly known in the art, and preferably mounted in the engine compartment of the vehicle.

Figure 5:
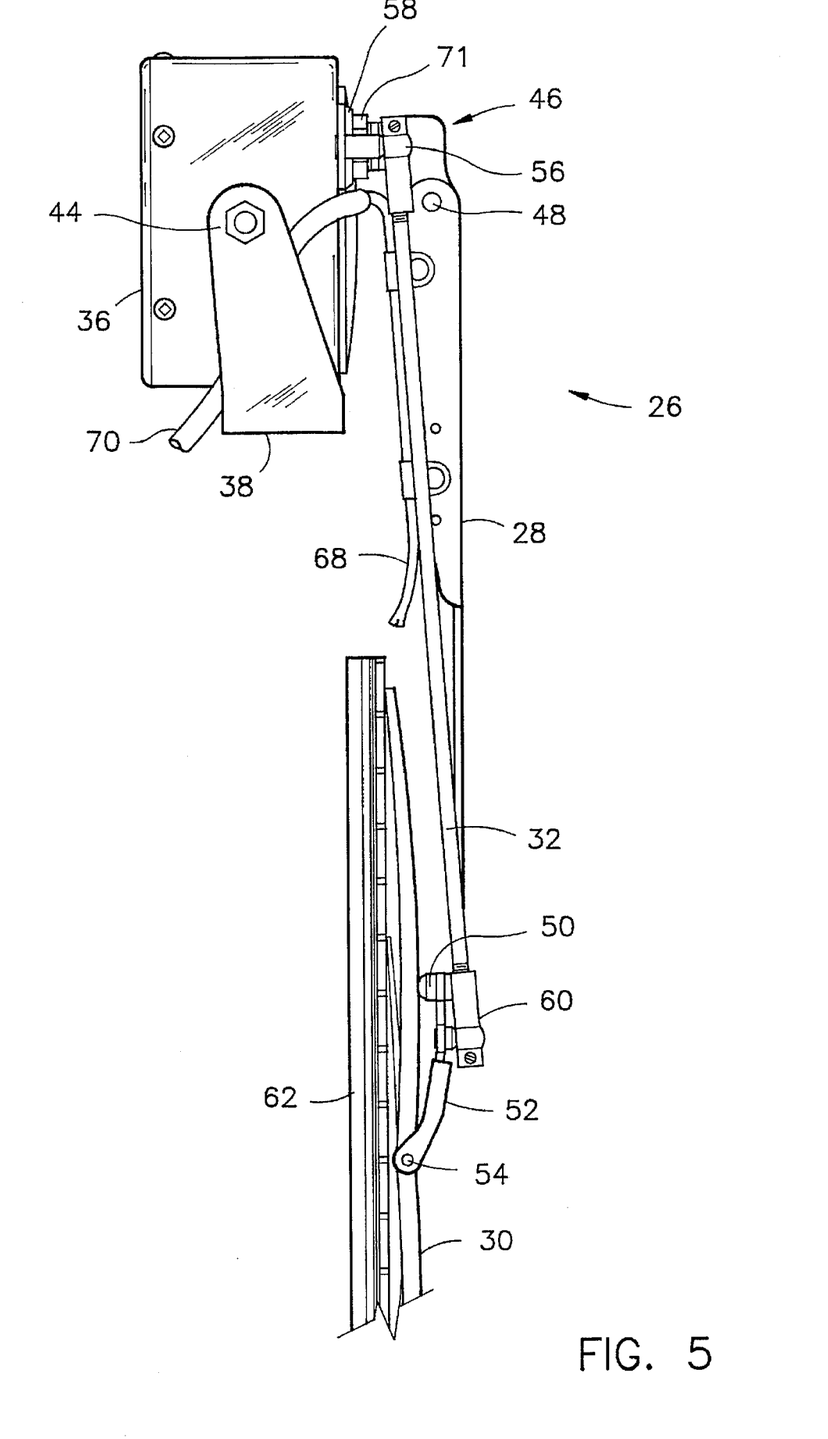
FIG. 5 is an enlarged side view of the wiper accessory.

Referring now specifically to FIGS. 4 and 5, the stationary plate 58 is held against the front surface of wiper drive module 36, by a retaining nut 71 which is better seen on FIG. 5. The stationary plate 58 is adjustable within an angular displacement 73 about the drive shaft 46, to thereby adjust the longitudinal orientation of the wiper blade 30 relative to the longitudinal axis of the mirror 20. The adjustment of the stationary plate 58 is done by loosening and re-tightening nut 71 to retain the proper alignment of stationary plate 58.

FIG. 5 illustrates a side view of a wiper accessory in its integral form, before installation on a side mounted rear view mirror. A typical installation of the wiper accessory 26 on a common side mounted rear view mirror of a highway trailer truck for example comprises the mounting of bracket 38 on either the top bolt 22 or on the bottom bolt 24 retaining the mirror 20 to the support arms 114 as later explained when making reference to FIGS. 10 and 11. A further step to install the wiper accessory 26 comprises the positioning of the drive module 36 to obtain a desired viewpoint from auxiliary mirror 40, and the tightening of the mounting bolt 22 or 24 to retain the position of bracket 38 relative to the support arm 114. Power supply wiring for the electric motor drive, and hose means 70 for the washing fluid are routed along the support arm 114 and into the vehicle's engine compartment.

Referring now specifically to FIGS. 6 and 7, the preferred wiper arm 28 of the wiper accessory 26 is the type with a tension spring 75 acting upon pivot 48 to cause the wiper blade edge 62 to maintain a pressure against the mirror glass 64. The ball and socket joints 56 and 60 of pantograph link rod 32 are of the type having a rounded stem 74 or 76, and a hollow connector 72. A first rounded stem 74 is mounted on stationary plate 58, while a second rounded stem 76 is mounted on the swivel plate 34. Each of the hollow connectors 72 is preferably engaged on a respective end of the link rod 32 by means of a thread, whereby a distance between each hollow connector is adjustable, and whereby an alignment of the longitudinal orientation of the wiper 30 in relation to the longitudinal axis of the mirror 20 is also adjustable.

Figure 8:
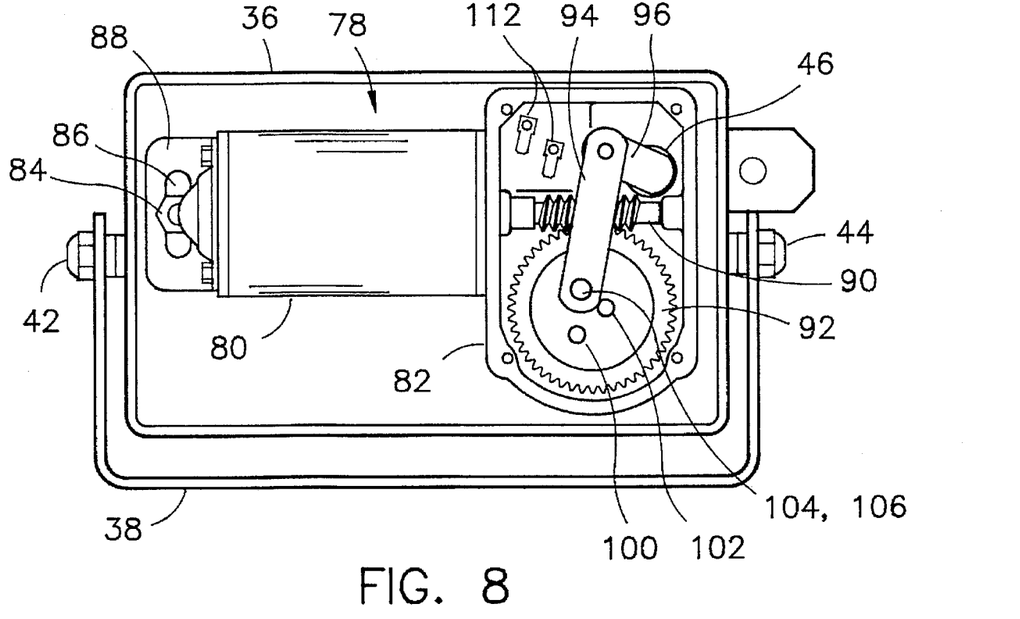
FIG. 8 illustrates the internal components of the wiper drive unit. The wiper drive unit is illustrated from its rear side, with the housing cover removed.
Figure 9:
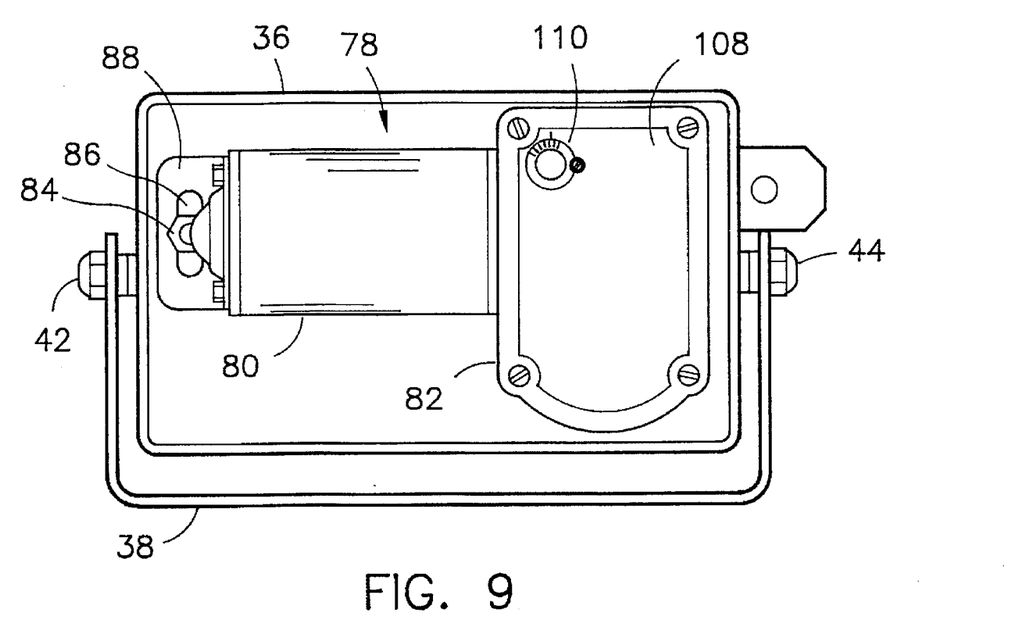
FIG. 9 is a rear view of the wiper drive unit showing the wiper blade stop point adjustment dial.

The wiper accessory 26 is driven by an electric drive unit 78 generally known in the art. FIGS. 8 and 9 illustrate the electric drive unit 78 mounted inside the drive module 36. The drive unit 78 typically comprises a D.C. motor 80 and a worm gear drive 82. The drive unit 78 is held inside the drive module 36 by the retaining nut 71 on a threaded sleeve around the drive shaft 46 as illustrated on FIG. 5, and by a threaded stem 84 protruding from within the housing of drive module 36. A mounting bracket 88 on the D.C. motor 80 has a slot 86 for engaging with stem 84. The slot 86 in the mounting bracket 88 provides the means for the angularly positioning of the drive unit 78 about the axis of the drive shaft, 46, and thus provides the means for positioning the sweep area of the wiper blade 30 relative to the width of the reflective surface 64 of mirror 20.

The preferred worm gear drive of the present invention is the type with a worm shaft 90, a worm gear 92, a first crank arm 94 connected to the worm gear 92 on a first end, and connected to a second crank arm 96 on the second end. Crank arm 96 is in turn connected to drive shaft 46. The worm gear 92 of the preferred worm gear drive 82 has three holes 100, 102 and 104 to selectively receive a pivot pin 106 on the first extremity of crank arm 94. Each of the holes 100, 102 and 104 are radially spaced a different distance from the centre of worm gear 92, such that a different sweep area by the wiper blade 30, may be obtained by optionally changing the effective travel of pivot pin 106. The three holes 100, 102 and 104 are positioned at locations which correspond to a wiper blade displacement, for example of 5½", 6", and 6½", to cover the width of most commonly used side mounted rear view mirrors 20.

The drive unit 78 is illustrated on FIG. 9 with the cover 108 installed on the worm gear drive housing. The cover has a stop point adjustment dial 110 to adjust an internal switch, part of which is illustrated as contact points 112 on FIG. 8. The stop point adjustment dial 110 is one ordinary in the trade of wiper drive unit, and is used to adjust the stop point of the wiper blade 30.

Figure 10:
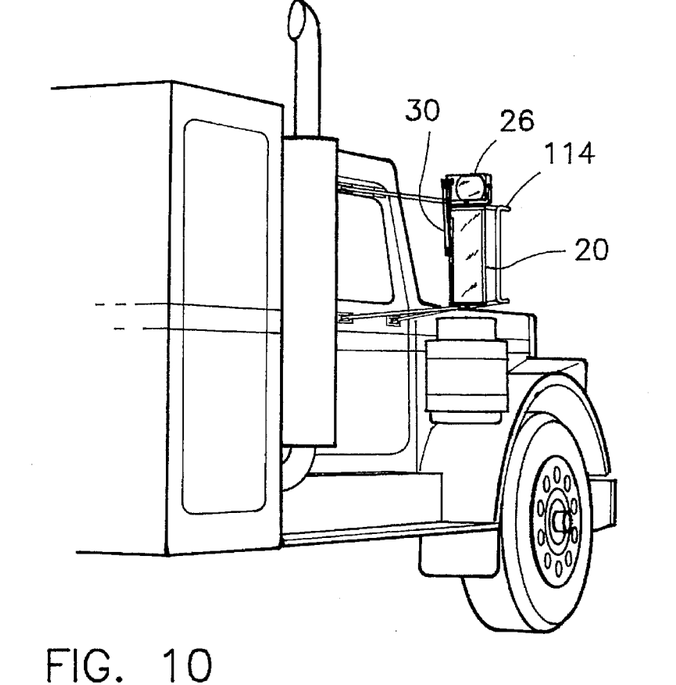
FIG. 10 is a preferred mounting of the wiper accessory on the passenger side of a side mounted rear view mirror of a truck.
Figure 11:
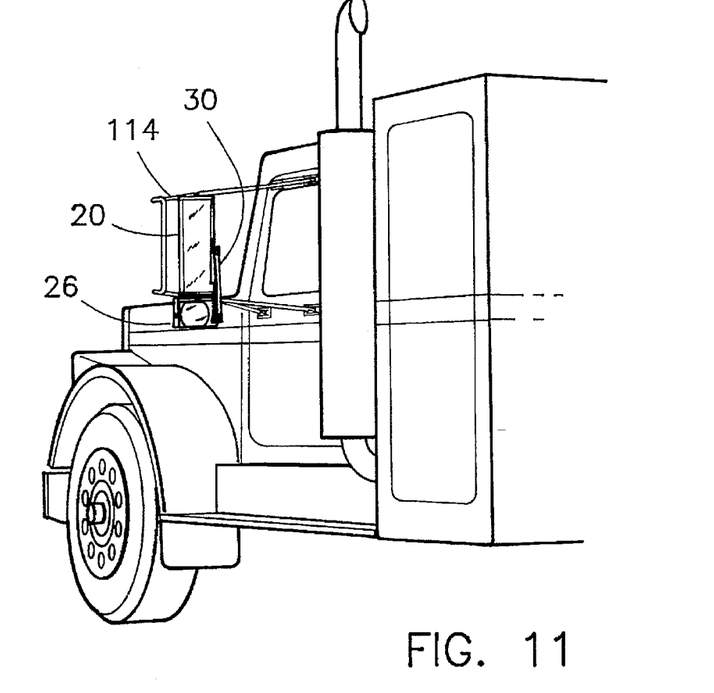
FIG. 11 is a preferred mounting of the wiper accessory on the driver side of a side mounted rear view mirror of a truck.

Referring now specifically to FIGS. 10 and 11, the wiper accessory 26 may be mounted atop a side mounted rear view mirror 20 as illustrated on FIG. 10, or under a side mounted rear view mirror 20 as illustrated on FIG. 11. The wiper accessory 26 is mounted on the portion of the bolt extending from the mirror 20 and protruding through the support arm 114.

Whether the wiper accessory 26 is installed atop or below the mirror 20, it is preferred to position the wiper blade 30 on the driver side of the mirror 20. The advantage of this installation is that the truck driver's view in the mirror 20 is not hindered by the reflection of the wiper blade 30.

While the preferred embodiment of the invention has been described as a wiper accessory to be mounted on a rear view mirror being held in place by two vertical mounting bolts, the wiper accessory of the present invention may be mounted on other types of rear view mirrors. For example, another type of mirror known in the art is held to the truck door by a single arm extending from the forward side of the mirror. The wiper accessory of the present invention may also be mounted on those mirrors provided that a stem member is added to the top or to the bottom portion of the mirror frame. Such stem member should have dimensions to mate into the mounting hole of mounting bracket 38 of the preferred embodiment.

Therefore, the preferred embodiment of the invention as described herein is not limited thereto, and it will be apparent to those skilled in the art that numerous modifications form part, of the present invention insofar as they do not depart from the spirit, nature and scope of the described and claimed invention.

I claim:

1. A wiper accessory for mounting on a rear view mirror of a vehicle, said wiper accessory having;

a wiper blade, a drive module comprising a housing, a reciprocal wiper motion drive means mounted inside said housing and an elongated wiper motion transmitting means connected to both said reciprocal wiper motion drive means and said wiper blade, said elongated wiper motion transmitting means extending outside and away from said housing for moving said wiper blade in a reciprocal movement at a distance from said drive module;

a mounting means for mounting said drive module on said rear view mirror near a periphery of said rear view mirror; and an auxiliary mirror mounted on an outside surface of said housing, whereby when said drive module is mounted on said rear view mirror with said outside surface adjacent said rear view mirror, a sightless area caused by said drive module is advantageously covered by said auxiliary mirror for enhancing a rearward visibility of a person looking toward said rear view mirror.

2. A wiper accessory as claimed in claim 1, wherein said mounting means is a U-shaped bracket comprising a horizontal member and two spaced apart vertical members having each a retaining pivot means horizontally in line with one another and respectively pivotally connected to said housing for retaining said drive module in a rotatively adjustable manner about an axis defined by the alignment of said retaining pivot means.

3. A wiper accessory as claimed in claim 1, wherein said auxiliary mirror is a convex mirror.

4. A wiper accessory as claimed in claim 1 wherein said reciprocal wiper motion drive means is a rotary drive means and said elongated wiper motion transmitting means comprises a rotatable drive shaft extending from said rotary drive means and a wiper arm means mounted on said shaft for moving said wiper blade along an arcuate reciprocal movement about an axis of rotation of said drive shaft.

5. A wiper accessory as claimed in claim 4, wherein said wiper motion transmitting means also comprises pantograph linkages for retaining said wiper blade in a constant alignment during said arcuate reciprocal movement.

6. A wiper accessory as claimed in claim 5, wherein
said wiper arm means is a wiper arm having a first end and a second end, said first end being rigidly mounted on said drive shaft of said rotary drive means, and said pantograph linkages comprises;
a pantograph link rod having a first and second extremities, and a flexible joint at each of the first and second extremities,
a stationary plate having a hole encircling said drive shaft of said rotary drive means, and a first rounded stem spaced from said hole and connected to said flexible joint on said first extremity of said pantograph link rod,
a swivel plate having a second rounded stem connected to said flexible joint on said second extremity of said pantograph link rod, an extension tab connected into a mounting clip of said wiper blade, and a pivot pin connected to said second end of said wiper arm,
whereby during operation of said wiper blade, said wiper blade is held perpendicular to a general direction of said arcuate reciprocal movement.

7. A wiper accessory as claimed in claim 6 wherein said stationary plate is held in place against a surface of said drive module by a nut on a threaded sleeve around said drive shaft, and whereby an angular position of said stationary plate relative to said drive shaft, and a corresponding position of said reciprocal movement relative to said drive module is adjustable by working both said stationary plate and said nut.

8. A wiper accessory as claimed in claim 6 wherein said rotary drive means comprises; a rotary motor driving a worm shaft and a worm gear, an elongated link member having a first and second ends, said first end being pivotally connected to a crank arm on said drive shaft, and said second end being pivotally connected to said worm gear by means of a pin through said second end and through said worm gear, and wherein said worm gear has three holes for selectively receiving said pin, each of said holes being spaced a different distance from the centre of said worm gear, whereby a connection of said pin in any one of said holes produces a different displacement of said crank arm when said worm gear is rotating, and produces a corresponding different area covered by said reciprocal movement of said wiper blade.

9. A wiper accessory as claimed in claim 6, wherein said wiper arm has nozzle means for spraying a washing fluid near said wiper blade.

10. A wiper accessory as claimed in claim 5 wherein said wiper motion transmitting means is flexible in a direction perpendicular to a plane defined by said arcuate reciprocal movement, whereby when said drive module is mounted on said rear view mirror with an axis of rotation of said rotatable drive shaft defining an acute angle with a reflective surface of said rear view mirror, said arcuate reciprocal movement is nonetheless co-planar with said reflective surface.

11. A wiper accessory as claimed in claim 4, wherein said rotary drive means has;
a bracket mounted on said rotary drive means at a radial distance from said axis of rotation of said drive shaft,
and said bracket has a slot oriented along an arc about said axis of rotation of said drive shaft; and
said rotary drive means is held inside said housing by a fastener on said drive shaft and by a bolt through said slot and through a wall of said housing;
wherein a rest position of said wiper arm means relative to said drive module is adjustable about said axis of rotation of said drive shaft, by changing a position of said slot relative to said bolt.

12. A combination of a side-mounted-type rear view mirror for a vehicle and a wiper accessory mounted thereon,
said rear view mirror having a vertical longitudinal axis, and a top and bottom mounting bolts,
said wiper accessory having;
a wiper blade,
a drive module comprising a housing and a rotary drive means mounted inside said housing for moving said wiper blade in a reciprocal movement across a reflective surface of said rear view mirror,
an arm means between said wiper blade and said rotary drive means for guiding said movement of said wiper blade at a radial distance from an axis of rotation of said rotary drive means, said arm means being flexible in a direction of said axis of rotation, and
a mounting means for retaining said drive module to one of said top and bottom mounting bolts, said mounting means being a U-shaped bracket comprising an horizontal member having one hole for mating onto said one of said top and bottom mounting bolts in a rotatively adjustable manner about an axis defined by said one of said top and bottom mounting bolts, and two spaced apart vertical members having each a retaining pivot means horizontally in line with one another and respectively connected to said housing for retaining said drive module in a rotatively adjustable manner about an axis defined by the alignment of said two retaining pivot means.

13. A combination of a side-mounted-type rear view mirror and a wiper accessory as claimed in claim 12, wherein said arm means comprises a pantograph linkage means for retaining said wiper blade in a constant vertical alignment during said reciprocal movement.

14. A combination of a side-mounted-type rear view mirror and a wiper accessory as claimed in claim 12, wherein said one of said top and bottom mounting bolts is longer than a thickness of said horizontal member, whereby a mirror support arm is attachable to a portion of said one of said top and bottom mounting bolts extending beyond a thickness of said horizontal member.

15. A combination of a side-mounted-.type view mirror and a wiper accessory as claimed in claim 12, wherein said housing is a generally rectangular housing, and an auxiliary mirror is mounted on a face of said rectangular housing adjoining a reflective surface of said rear view mirror.

16. A rear view mirror mounted on the side of a vehicle, having; a near edge and a far edge relative to a position of a driver of said vehicle,
a wiper accessory mounted on said rear view mirror near a reflective surface of said rear view mirror, said wiper accessory having;
a wiper blade,
a drive module comprising a reciprocal wiper motion drive means for moving said wiper blade in a reciprocal movement across and within said reflective surface of said rear view mirror, and an auxiliary mirror mounted on a surface of said drive module for advantageously enhancing a rearward visibility of said driver.

17. A rear view mirror as claimed in claim 16, wherein said reciprocal wiper motion drive means is a rotary drive means having a pantograph linkage means for retaining said wiper blade in a constant alignment during said reciprocal movement.

18. A rear view mirror as claimed in claim 16 wherein said wiper accessory is mounted onto said mirror by means of a U-shaped bracket, and wherein said U-shaped bracket comprises; an horizontal member having one hole for mating onto a vertical mounting bolt on said rear view mirror in a rotatively adjustable manner about an axis defined by said bolt, and two spaced apart vertical members having each a retaining pivot means horizontally in line with one another and respectively connected to said drive module for retaining said drive module in a rotatively adjustable manner about an axis defined by the alignment of said two retaining pivot means.

19. A rear view mirror as claimed on claim 16 wherein said reciprocal wiper motion drive means has switch means for stopping said wiper blade along said near edge of said mirror.

20. A rear view mirror as claimed in claim 16 wherein said auxiliary mirror is a convex mirror.

* * * * *